Feb. 28, 1961     J. H. GERMANY     2,972,887
THERMOSTAT MOUNTING ASSEMBLY FOR HOT WATER HEATERS
Filed Jan. 9, 1958
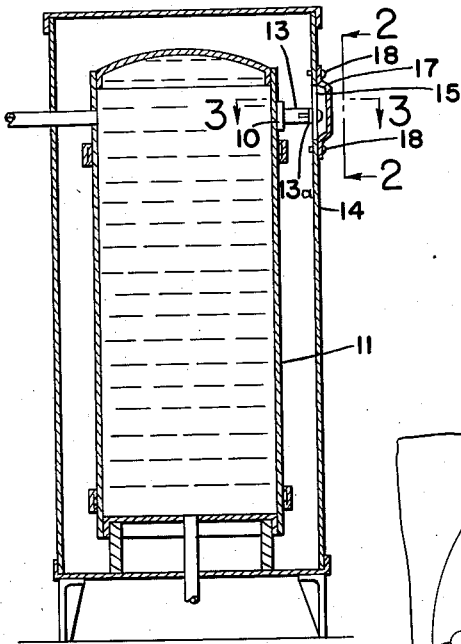
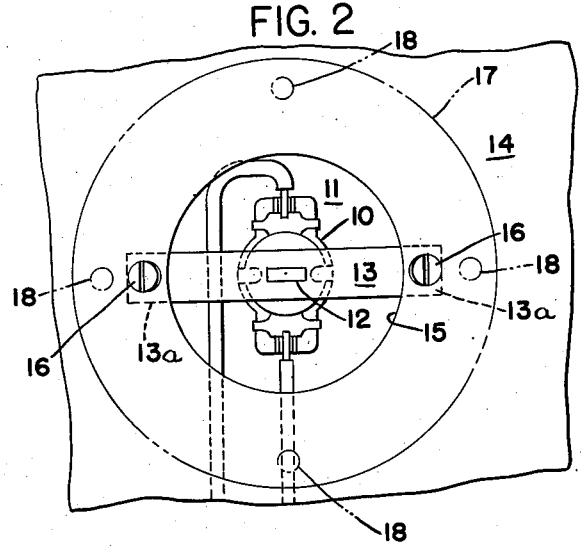
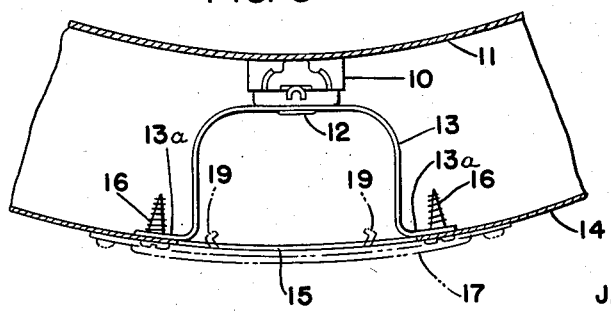
INVENTOR.
JAMES H. GERMANY
BY
ATTORNEY United States Patent Office 2,972,887
Patented Feb. 28, 1961

2,972,887
THERMOSTAT MOUNTING ASSEMBLY FOR HOT WATER HEATERS

James H. Germany, Mansfield, Ohio, assignor, by mesne assignments, to Therm-O-Disc, Incorporated, Mansfield, Ohio, a corporation of Ohio Filed Jan. 9, 1958, Ser. No. 707,976

2 Claims. (Cl. 73—339)

This invention relates to the mounting of a over-temperature protective thermostat between a container such as the tank of a household water heater and the spaced-away wall of an outer casing, with the thermal-responsive element of the thermostat held close to the wall of the tank, as by pressure contact of one face of the thermostat housing against the tank, and with the opposite side of the thermostat readily accessible, as for adjustment, through a hole in the outer casing.

Its chief objects are to provide a simple inexpensive and dependable mounting for an overtemperature protective thermostat; to provide facility of procedure in the mounting and dismounting of the thermostat; to provide an assembly in which the thermostat will continue to have approximately the same desirably high pressure against the tank in spite of changes of temperature of the tank wall and adjacent parts; and to provide for holding of the thermostat in place by a minimum of holding parts or elements.

These and other objects and advantageous features of the invention, not at this time more particularly pointed out, will become more apparent as the nature of the invention is better understood from the following detailed description taken in conjunction with the accompanying drawing, wherein like reference characters denote corresponding parts, and wherein:

Figure 1 is a vertical medial sectional view of a household water heater and, in operative association therewith, a thermostat and mounting assembly embodying my invention in its preferred form, Figure 2 is a fragmentary elevational view of the same taken along the line 2—2 of Figure 1, with a closure plate and its attaching screws indicated in phantom lines, and Figure 3 is a sectional view taken on the line 3—3 of Figure 1.

With reference to the accompanying drawings the thermostat's housing 10, to be held in pressure contact with the wall 11 of a hot water tank, preferably is given at that side of it a shape generally complemental to the exterior surface of the wall of the tank. At its opposite side it preferably is formed with means, such as an integral lug 12, for interlocking it, against both horizontal and vertical relative movement, in a complemental opening formed in the middle part of a U-shaped single leaf spring presser member 13.

The water heater's outer casing, 14, is formed, at a position opposite the thermostat, with an access opening 15 and the end portions 13a of the legs of the spring member 13, preferably extending along the inner wall surface of the casing, are in pressure contact with the said surface, at opposite sides of the opening, because of recoil force in the spring member.

The spring member 13 preferably is of such size and shape in is unstrained condition that when it is in operative position it will strongly press the thermostat against the exterior wall of the tank, with its end portions 13a having correspondingly strong pressure against the inner wall surface of the casing 14. The pressure can be sufficiently strong for frictionally holding the spring and the thermostat in their operative relationship. Preferably however, more secure anchorage is obtained by the use of positive fastening means, such as the self-tapping sheet metal screws 16, 16, extending through the casing wall and the respective end portions 13a of the spring in clamping relationship.

When the end portions of the spring are held, either by friction or by fastening means, against sliding movement, the rest of the spring preferably is so shaped that the intermediate part of each half of it is pronouncedly bowed away from an imaginary straight line extending from the middle of the spring to its anchored end portion, so that each half of the spring can function in the manner of a C-spring.

The structure is such that a closure plate 17 can easily be secured in place, as by means of attaching screws 18, 18 and for by snap springs 19, 19 (see Figure 3) of the hub-cap type. The closure plate 17 here shown is of dished shape for accommodation of the heads of the screws 16 for holding the spring member in operative position. It can serve also as a name plate or data panel.

The dimensions of the parts, as shown, are such that the thermostat and the spring can be easily inserted through the opening in the wall of the casing and brought to their final positions, with good access to the thermostat for holding it in position while the elements of the spring member are brought to their final position.

Having thus described my invention so that those persons skilled in the art may understand and practice the same, what is desired to obtain by Letters Patent is embodied in the appended claims.

I claim:

1. An assembly comprising a thermostat and holding means therefor adapted to be mounted between the wall of a container and an outer wall spaced therefrom and formed with an access opening, the thermostat having a face to be held against the wall of the container and the holding means comprising a U-shaped leaf springs interposed under stress between the thermostat and the said outer wall to hold the thermostat in pressure contact with the wall of the container said spring arranged to have its mid-portion engaging and traversing the thermostat and its leg members engaging and secured to the surface of said outer wall adjacent the said access opening.

2. An assembly as defined in claim 1 in which the thermostat and the spring are formed with respective interlocking elements, engageably with each other by relative movement normal to the walls, for interlocking the thermostat and the spring against relative movement in a direction transverse to the first said movement.

References Cited in the file of this patent
UNITED STATES PATENTS

| | | |
|---|---|---|
| 2,427,806 | Neild | Sept. 23, 1947 |
| 2,520,872 | Zuehlke | Aug. 29, 1950 |
| 2,608,863 | Erbguth | Sept 2, 1952 |
| 2,717,290 | Thornbery | Sept. 6, 1955 |